3,196,647
CONTROL OF HYDRAULIC FORGING PRESSES
Ralf Schneider, Dusseldorf-Ratingen, Germany, assignor to Schloemann Aktiengesellschaft, Dusseldorf, Germany
Filed July 14, 1961, Ser. No. 124,191
Claims proirity, application Germany, July 21, 1960, Sch 28,200
4 Claims. (Cl. 72—21)

The invention relates to a process and a device for controlling hydraulic forging presses, and more especially to a process and device for controlling the valves of hydraulic presses in dependence upon the travel of the die or dies. In known processes of this type, the upper die of the press or a part firmly connected to it, such as the transom, alternately actuates upper and lower contacts to control the press, the contacts being responsible for switching the press electrically or hydraulically. Owing to the lack of accuracy of this system the accuracy of the forgings produced is limited. A further disadvantage of this method of controlling a press is that in the actual forging dimension, that is to say, the distance between the lower edge of the upper die and the upper edge of the lower die, is not determined but must be measured manually. Also the magnitude of the over-run of the transom, that is to say the travel that the upper die makes past the lower switching point is not determined owing to inertia and other factors. Therefore the control of the press must be carried out in accordance with the height of the work-piece as manually determined. This height varies along the length of the piece being forged as a result of temperature variations. Manual measurement of the work-piece is tedious and gives inaccurate results.

One object of the invention is to provide for a more precise control of presses so that articles may be forged with greater dimensional accuracy and consequently subsequent machining operations to achieve the final dimensions are reduced as much as possible.

The invention consists in that an impulse generator, connected with the upper die, generates displacement-dependent and direction-dependent impulses, that is to say positive and negative impulses, and gives switching signals for the reverse switching of the direction of movement of the press to the valve control after movement through the given course or after the production of a certain number of impulses.

In order to facilitate adjustment or setting of the press for various sizes of work-piece, an oscillator is provided which adds positive or negative impulses to the impulses produced by the impulse generator, for the purpose of displacing the point at which the upper die is switched.

In the present observations, a distinction should be drawn between the reversing points at which the upper die actually reverses and the switching reverse points which always come somewhat before the reversing points. The distance between a reverse switching point and the actual reversing point is spoken of as over-run and only rarely amounts to more than 9 mm. It is due to inertia, the switching time of the magnetically operated valves and changes in temperature of the work-piece.

The process according to the invention can also be used with presses in which, in order to economise with pressure liquid or water, the return of the upper die is accomplished with the use of so-called "filling liquid" or filling water at a lower pressure instead of the pressure liquid whose pressure is much greater. After each forging stroke the upper die of the press must be lifted sufficiently in order to move the work-piece e.g. to turn it. In order to enconomise in pressure liquid, the upward stroke should be as short as possible. In coarse forging the height through which the upper die must be moved is, for example at most 400 mm., while by fine forging the maximum is 50 mm. Coarse forging is a manner of operation in which the work-piece is only approximately given the desired final form and usually large forging strokes are used. In fine forging, however, the work-piece is made to resemble the final form as much as possible in order to economise in subsequent machining operations such as planning and turning. In fine forging, therefore, generally only small strokes are used.

In order to economise in pressure liquid in coarse forging the upper die is moved down on to the forging block with low pressure liquid. Only then is a switch-over made to pressure liquid for the forming operation. On the other hand, in fine forging the upper die is made to move both upwards and downwards between the upper and lower reversing points exclusively with pressure liquid.

When coarse forging is to be carried out with filling liquid, the position of the upper die controls the entry of filling liquid into the press cylinder in the upper reversing point. Approximately at the point of contact with the work-piece, the filling liquid supply is cut off and the supply of pressure liquid automatically opened. By suitable construction of the control device it is possible to carry out alternate coarse and fine forging.

In order to take account of the over-run of the upper die, the former is measured in each stroke and indicated. On the basis of the value indicated the further control of strokes is corrected manually or automatically. The measurement or determination and the indication are carried out in a manner adapted to suit the digital control process already described, and is preferably also carried out digitally in such a manner that equal displacements of the die, for example of 1 mm., correspond to similar numbers of impulses for example 1 impulse for each 1 mm., as is the case by the control process according to the invention.

The invention relates to the construction of control devices with which the process according to the invention can be practised in an especially advantageous manner.

Figure 1:
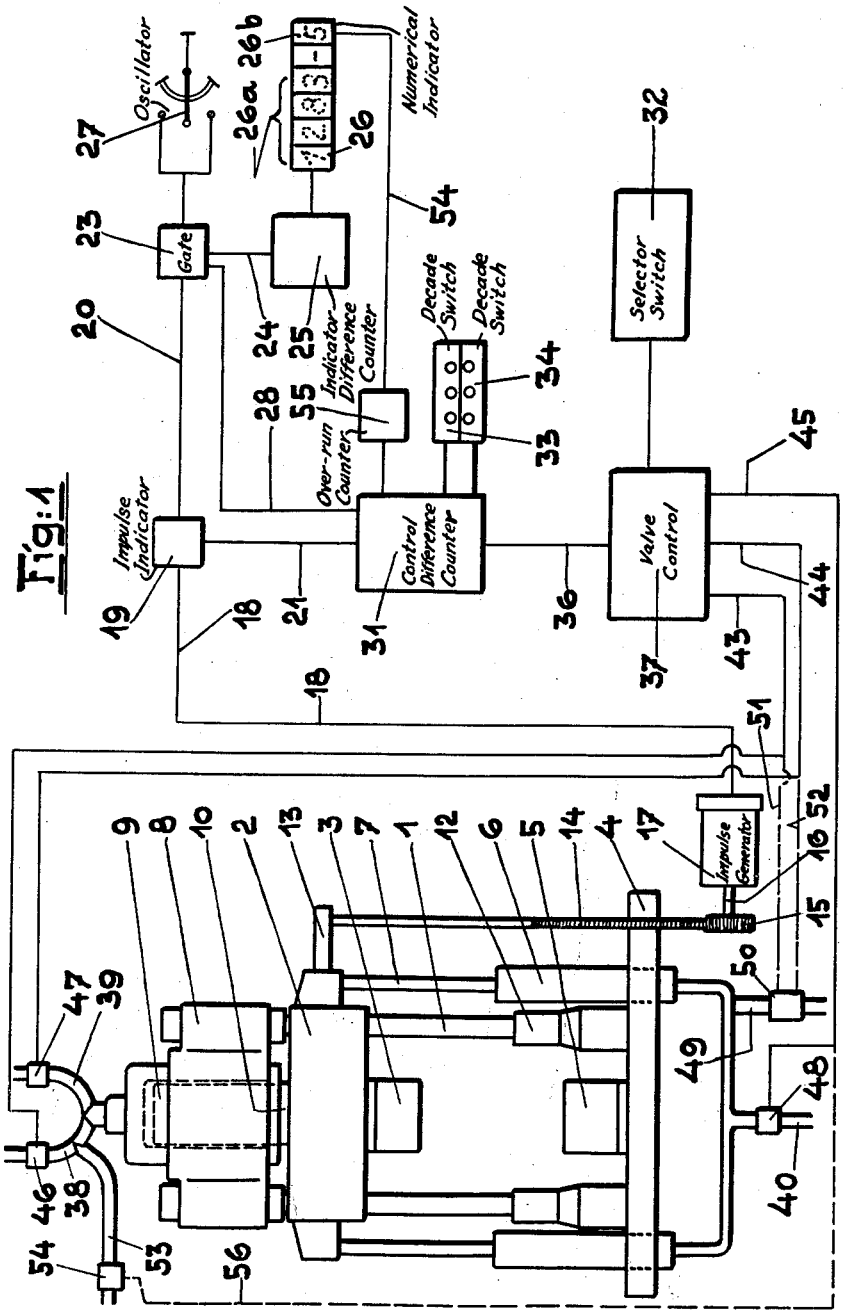
FIGURE 1 shows an illustrative construction of a control device according to the invention for carrying out the process according to the invention.

In FIGURE 1, denotes the columns of a forging press. A transom 2 is mounted so that it can be slid up and down these pillars 1, and an upper die 3, which is attached to the transom 2, is placed facing a lower die 5 connected with the base plate 4. To the side of the lower die 5 there are return cylinders 6, the pistons 7 of which are connected with the transom 2. A cylinder transom 8 is mounted on the pillars 1 and carries a press cylinder 9. A pressure piston 10 guided in the press piston 9 is fixed to the transom 2. In order to limit the stroke, limiting sleeves 12 are mounted on the pillars 1.

Figure 2:
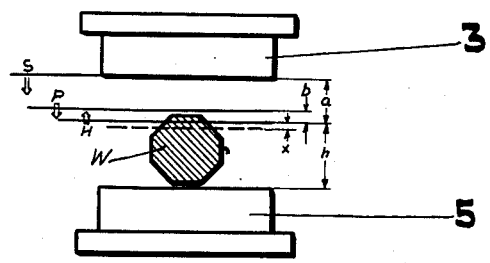
FIGURE 2 illustrates the problem controlling the method in coarse forging.

As shown in FIGURE 2 there are the following reverse switching points during coarse forging of a work-piece W. At S the upwardly travelling upper die 3 is switched to downward travel with filling liquid in the cylinder 9. When the upper die reaches the height P while travelling downwards there is a switch-over from filling to pressure liquid. Further downward movement is then carried out under pressure liquid, that is to say from the instant of contact of the upper die 3 with the work-piece W and during the succeeding plastic deformation of the work-piece. When the upper die 3 reaches the level H, it actuates the switching device which is to switch it to upward travel. As a consequence of the inertia and other causes, however, it makes a further travel $x$ (over-run) which is undesired but unavoidable. The man in charge of the press must now take care that the lower reversing point, that is to say the reverse switching point less the over-run, must correspond to the desired forging dimensions. He achieves this by moving the switching point H upwards. The switching will then take place before the upper die 3 has reached the level H, while the actual reverse takes place at the level H. In the drawing, $a$ indicates the total forging stroke while $b$ indicates the part of the pressing stroke which is accomplished using pressure liquid.

Figure 3:
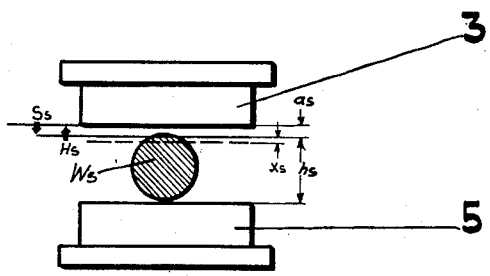
FIGURE 3 shows the problem of the control method in fine forging.

As shown in FIGURE 3, in the fine forging of a work-piece $Ws$ there are the following reversing points: $Ss$ indicates the highest position of the upper die 3, at which an upward stroke is changed into a downward stroke. $hs$ indicates the desired forging dimension, while $xs$ indicates the over-run which is to be expected when the downwardly moving upper die 3 is reversed at the level $Hs$. $hs$ is the desired dimension and $as$ represents the height of the fine strokes which must be performed if the work-piece $Ws$ is to be deformed so as to have the height $hs$.

By means of a cross piece 13, a rack 14 is connected to the transom 2 and actuates a pinion 15 and thereby an impulse generator 17 which is connected to the pinion 15 by means of a shaft 16.

Preferably the impulse generator is a Hall generator. The impulse generator 17 is connected by means of electrical leads 18 and 21 with a control difference counter 31. An impulse indicator 19 is connected to the leads 18 and 21 and, by means of an electrical lead 20, to a gate 23. The gate 23 is connected with an oscillator 27 which can be actuated manually by means of a switch. The oscillator delivers as desired positive or negative impulses to the gate 23. These impulses pass along the electrical lead 28 to the counter 31 and through an electrical lead 24 to an indicator-difference counter 25 and the positions 26a of a numerical indicator 26.

If impulses from the impulse generator 17 reach the counter 31 through the electrical leads 18 and 21, the impulse indicator 19 signals these to the gate 23 which prevents any impulses which may be sent out by the oscillator 27 along the electrical lead 28 from reaching the counter 31 simultaneously. The gate 23 only blocks the electrical lead 28 for the duration of each individual impulse.

The impulse indicator 19 is connected by the lead 21 with the counter 31 to which two decade switches 33 and 34 are connected. The decade switch 33 can be set by hand to the desired height of the upper switching point, and the decade switch 34 to the desired height of the switching point from filling liquid to pressure liquid above the lower switching point. While by actuation of the oscillator 27 all three switching points (for the upper and lower reversing points and also for the switching from filling water to pressure liquid and vice versa), can be raised and lowered together, the level of the upper switching point and the height of the switching point from filling liquid to pressure liquid above the lower switching point is achieved by means of the decade switches 33, 34. The counter 31 delivers, through a lead 36, to a valve control 37, the switching signals for the valve 46, in a filling liquid duct 38, and to two valves 47 and 48 in the two pressure liquid ducts 39 and 40 respectively. These three valves are connected with the valve control 37 by the electrical leads 43, 44, and 45. A waste liquid duct 53 with a controllable waste liquid valve 54 is connected to the ducts 38 and 39. The waste liquid valve 54 is opened through an electrical lead 56 as soon as the return valve 48 is opened. A waste liquid duct 49 with waste liquid valve 50 is also connected to the pressure liquid duct 40 of the return cylinder 6. The waste liquid valve 50 is opened through electrical leads 51 and 52 as soon as one of the leads 43 and 44 of one of the press valves 46 and 47 is opened. By means of a selector switch 32 the valve control 37 is set for coarse or fine forging operations. The counter 31 is associated with an over-run counter 55 which indicates the over-run $x$ in mm. in a position 26b on the numerical indicator 26 with which it is connected by a lead 54. The over-run counter 55 counts in each working stroke those impulses of the impulse generator 17 which appear owing to the over-run between the over shooting of the lower switching point and the actual reversing point of the pressing movement. The position 26b therefore indicates the magnitude of the over-run to be evaluated by the man in charge of the press for further control. It would also naturally be possible to feed the value of over-run indicated here automatically to the control device in the form of impulses.

The impulse indicator 19 serves as a control means for the gate 23 to prevent the simultaneous feeding of impulses from the generator 17 and oscillator 27 to the counter 31. The indicator 19 constitutes a time relay which is actuated by an impulse from the generator 17 and through the conductor actuates the gate 23 which operates as a relay to open or close the circuit from the oscillator 27 to the counter 31.

The difference counters 25 and 31 are of conventional construction and are of the type in which positive impulses provide an additive operation and negative impulses a subtractive operation.

Decade switches 33 and 34 are also of conventional construction and may be preset to operate when such pre-set condition is attained.

The valve control 37 is a switch box containing conventional switches which operate in response to control signals from the counter 31 to actuate the valves 46, 47 and 48.

The control device according to the invention is to be set to the upper edge of the lower die 5 as a zero point for measurements. As, however, lower dies of different heights can be used these control zero points must be capable of being corrected.

Normally the two dies 3 and 5 are brought together and their contact surface used for a zero point for further control purposes. If, however the upper die is unable to reach the lower die owing to the transom 2 coming into contact with the limiting bushes 12, the distance between the lower edge of the upper die and the upper edge of the lower die 5 must be measured and used for control.

Let it be supposed that each impulse corresponds to a travel of 1 mm. and that when the transom 2 makes contact with the limiting bushes 12 there is a distance of 283 mm. between the lower edge of upper die 3 and the upper edge of the lower die 5. Then the oscillator 27 is caused to give 283 impulses to the indicator and control difference counters 25 and 31, and the counter 31 is set to zero by means of a zero key. It will therefore be seen that in this example the zero setting of counter 31 corresponds to 283 mm. which is the distance between the dies when the crosshead 2 contacts bushes 12.

Supposing that the forging dimension between the upper edge of the lower die and the upper edge of the work-piece to be produced is 1283 mm. the oscillator 27 is caused to give a further 1000 impulses to the counters 25 and 31 so that the numerical indicator 26 indicates the number 1283 in the positions 26a. After the upper switching point has been given on the decade switch 33 and the switching point for the change from filling to pressing liquid (or vice versa) has been given on the decade switch 34, all three switching points are continuously fed by the counter 31 into the electrical valve control 37. The setting of the selector switch 32 determines whether the set up is to be for coarse or fine forging.

If the return valve 48 and the waste liquid valve 54 are opened, the entering pressure liquid moves the pistons 7 with the transom 2 towards the upper switching point. The rack 14 is moved upwards with the transom 2 and rotates the impulse generator 17 through the pinion 15, so that impulses are produced continuously corresponding in number to the units of distance travelled, for example, one impulse per 1 mm. The impulses are passed through the impulse indicator 19 to the counter 31.

If, calculated from the lower switching point, that number of impulses has been fed into the counter 31 which corresponds to the height of the upper switching point above the zero point (upper edge of the lower die 5), the filling liquid valve 46 and the waste liquid valve 50 are opened so that filling liquid flows through the pipe 38 to the press cylinder 9.

At the same time the pressure liquid valve 48 and the waste liquid valve 54 are closed. The transom 2 with the upper die 3 is now moved under the action of the filling liquid towards the lower die 5. Shortly before the contact of the upper die 3 with the work-piece, the decade switch 34 which has been set to the switch point from filling to pressure liquid, causes the pressure liquid valve 47 in the pipe 39 to be opened and pressure liquid passes to the press cylinder 9, while the filling liquid valve 46 is colsed so that the connection with the supply of filling liquid is broken.

The transom 2 is now driven downwards by the pressure liquid and on reaching the lower switching point is switched around by the counter 31 and the valve control 37, whereupon pressure liquid is fed to the return cylinders 6.

Owing to inertia, to the switching time of the magnetically operated valves, and to temperature differences in the work-piece along its length, the over-run of the transom 2 past the lower switching point varies. This over-run is indicated to the press operator, while, on the lower switching point being reached, the over-run counter 55 is switched in. The latter only receives those impulses from the counter 31 which are generated during the downward movement of the press, and after the completion of a pressing stroke indicates in the position 26b of the numerical indicator 26 the magnitude of the over-run. For instance if 5 is indicated on the position 26b the press operator will know that the transom 2 has over shot the lower switching point by 5 mm. In order to relate the over-run in the next working stroke to the stroke necessary for the intended forging dimension a train of 5 negative impulses is generated with the aid of the oscillator 27. These impulses displace the lower switching point by 5 mm. (equal to 5 impulses) upwards so that the actual forging dimension is now 1283 mm. although the lower switching point for the upper forging die is now 1288 mm. above the upper edge of the lower forging die.

In this operative step, the upper switching point, the switching point from filling to pressing liquid, and the lower switching point have all simultaneously been made 5 mm. higher. As the impulses of the oscillator 27 are fed to the difference counters 31 and 25, while impulses from the impulse generator 17, which may for example be a Hall generator, come to the counter 31, the displacement occurs steadily during forging. If in the next stroke there is again a falling short of the desired forging dimension, the correction is repeated in the same manner.

As soon as the work-piece has been forged down to the desired forging dimension, by means of a displacement (as with the correction of over-run) the upper switching point, the switching point from filling to pressure liquid and the lower switching point are set to a new forging dimension.

In fine forging the control of the stroke is carried out in a similar manner, with the difference, however, that the selector switch 32 is set for fine forging, so that on reaching the upper switching point there is a switching over to pressure liquid by opening the pressure valve 47 instead of switching on to filling liquid.

In further explanation of the type and operation of the various components indicated by numbered and legended boxes in FIG. 1 of the drawings, the shaft 16 of the impulse generator 17 is driven by the rack 14 and pinion 15 in response to upward or downward movements of the transom or crosshead 2 carrying the upper die 3. The output of the generator 17 transmitted through the conductor 18 to the impulse indicator 19 is in the form of a voltage impulse which is positive for an upward movement of the crosshead 2 and negative for a downward movement thereof and the number of impulses is proportional to the distance of travel of the crosshead 2.

Figure 4:
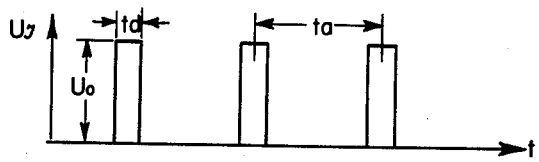
FIGS. 4 and 5 show the shape, magnitude duration and spacing or frequency, respectively, of the positive and negative voltage impulses provided by the impulse generator.
Figure 5:
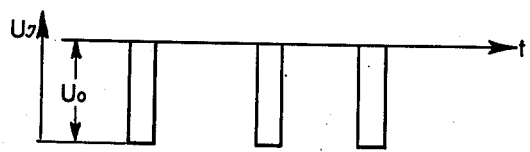

The shape of the positive and negative impulses are shown in FIGS. 4 and 5, respectively. The impulse magnitude $U_0$ and the impulse duration $t_d$ are constant while the time interval $t_a$ between impulses is proportional to the speed of movement of the crosshead 2. At a constant speed of movement of the crosshead 2 the impulse frequency $f_j$ may be stated by the expression $$f_i = \frac{1}{t_a}$$

As an example, if one impulse from the generator 17 corresponds to a movement of the crosshead 2 of one mm. then movement of the crosshead 2 through one hundred mm. will result in a generator output of one hundred impulses which would be negative for downward movement or positive for upward movement of the crosshead 2.

The impulse indicator 19, as stated above, receives impulses from the generator 17 and transmits all of such impulses either positive or negative through the conductor 21 to the control difference counter 31. At the same time the impulse indicator 19 transmits the same number of impulses, but always positive through the conductor 29 to the gate 23.

As an example, if the impulse indicator 19 receives one hundred negative impulses, the same number of negative impulses will be transmitted to the control difference counter 31 but one hundred positive impulses will be transmitted to the gate 23.

The oscillator 27 is selectively energized by a positive or negative direct current voltage and provides an output voltage impulse to the gate 23 of the same character as the output of the impulse generator 17. The output impulse of the oscillator 27 is positive for a positive input and negative for a negative input. The output frequency of the oscillator 27 must be sufficiently low to permit manual observation of impulse counting by the indicator difference counter 25 appearing on the numerical indicator 26a.

As an example, if the lower limit of travel of the crosshead 2 is to be moved upward a distance of five mm. a positive input voltage is applied to the oscillator 27 for a sufficient time to provide five positive output impulses which appear and may be observed on the numerical indicator 26a and which are transmitted through the conductor 28 to the control difference counter 31.

The gate 23 receives impulses from the impulse indicator 19 and/or from the oscillator 27, and if no impulses are received from the impulse indicator 19 the oscillator impulses are transmitted unchanged to the indicator difference counter 25 and to the control difference counter 31.

Decade switches 33 and 34 are of similar construction, and the switch 33 serves to control the location of the upper position at which the crosshead 2 reverses from upward to downward movement while the switch 34 serves to control the position at which flow of filling liquid ceases and flow of pressure liquid begins. The locations of these positions are measured in mm. from the lower limit of travel of the crosshead 2, this distance being indicated by a number. For each digit of the number there is provided a switch on each decade switch 33 and 34 which may be set to any one of ten positions as from 0 to 9.

Each decade switch 33 and 34 may be set to the proper number and each will transmit this number of positive impulses to the control difference counter 31.

As an example, if the position at which flow of filling liquid ceases and flow of pressure liquid begins is ten mm. above the lower limit of travel of the crosshead 2, the decade switch 34 is set to ten, and upon manual actuation of a push button, not shown, the decade switch 34 will transmit ten positive impulses to the control difference counter 31.

Figure 6:
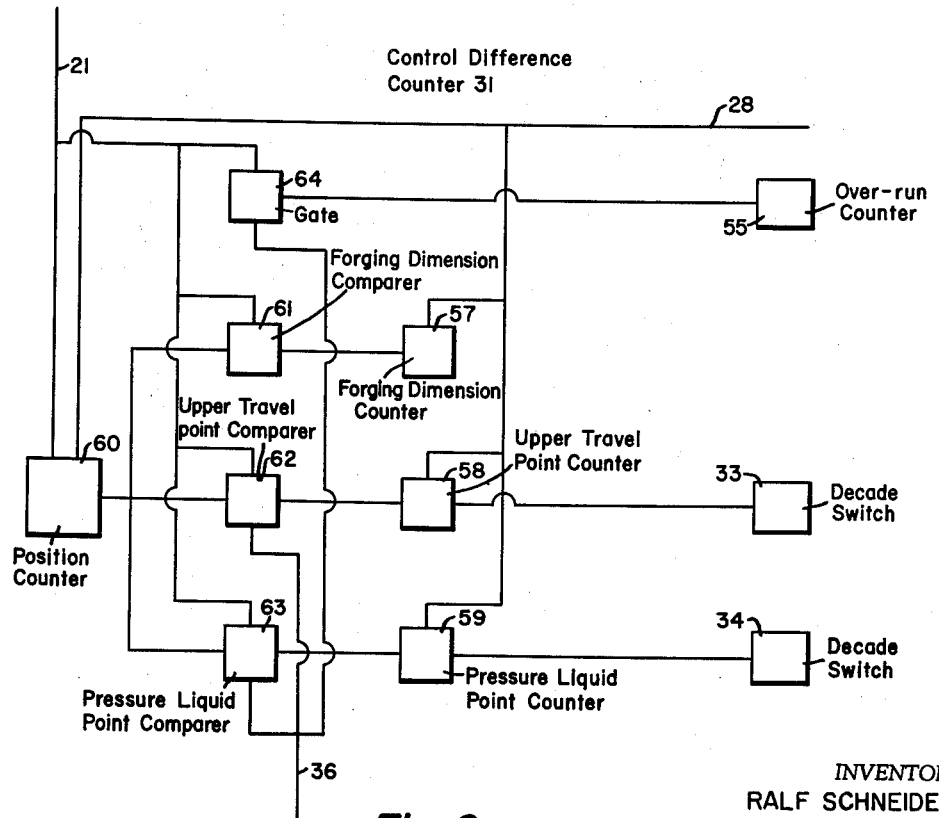
FIG. 6 is a diagrammatic view showing the components and electrical connections comprising the control difference counter.

The control difference counter 31 consists of several components combined into a single unit, and the same is shown diagrammatically in FIG. 6. The control difference counter 31 receives positive or negative impulses from the oscillator 27 and the number of such impulses together with their signs indicate the lower reversing position of the crosshead 2 and consequently the dimension of the forging to be produced. The control difference counter 31 also receives positive impulses from the decade switch 33, the number of which indicate the upper reversing point of the crosshead 2 and further receives positive impulses from the decade switch 34, the number of which indicates the position at which flow of filling liquid ceases and flow of pressure liquids begins. The input to the control difference counter 31 also includes the positive and negative impulses generated by the impulse generator 17 and fed to the control difference counter 31 by the impulse indicator 19, the number and sign of these impulses indicating the momentary position of the crosshead 2.

The components of the control difference counter 31 includes a forging dimension counter 57 which comprises a switching device which is capable of counting forward or backward depending on the sign of the impulses received thereby from the oscillator 27. Positive impulses provide a forward count while negative impulses provide a backward count.

As an example, assume the forging dimension to be 1283 mm., 1283 positive impulses are fed from the oscillator 27 to the forging dimension counter 57. If thereafter the forging dimension is to be reduced by 5 mm., 5 negative impulses are fed from the oscillator 27 to the forging dimension counter 57 which provides a net result of 1278 mm.

The upper travel point counter 58 counts the positive impulses provided by the decade switch 33 and counts forward or backward respectively the positive or negative impulses received from the oscillator 27.

The pressure liquid point counter 59 counts the positive impulses received from the decade switch 34 and counts forward or backward respectively the positive or negative impulses received from the oscillator 27.

The position counter 60 counts the forward or backward respectively the positive or negative impulses received from the impulse generator 17 via the impulse indicator 19 and the positive or negative impulses received from the oscillator 27.

Forging dimension comparer 61 serves to compare the number indicated by the position counter 60 with the number indicated by the forging dimension counter 57 and if these numbers are in agreement, upon a downward movement of the crosshead 2 resulting in a negative impulse from the impulse generator 17 the forging dimension comparer 61 provides a positive impulse output.

Upper travel point comparer 62 serves to compare the number indicated by the position counter 60 with the number indicated by the upper travel point counter 58 and if these numbers are in agreement, upon an upward movement of the crosshead 2 resulting in a positive impulse from the impulse generator 17 the upper travel point comparer provides a positive impulse output.

Pressure liquid point comparer 63 serves to compare the number indicated by the position counter 60 with the number indicated by the pressure liquid point counter 59 and if these numbers are in agreement, upon a downward movement of the crosshead 2 resulting in a negative impulse from the input generator 17 the pressure liquid point comparer 63 provides a positive impulse output.

Gate 64 receives positive and negative impulses from the impulse generator 17 via the impulse indicator 19 and if the gate 64 has been opened by a positive impulse from the forging dimension comparer 61, and if the lower reversing point of the crosshead 2 has been over-run the gate 64 serves to transmit negative impulses from the impulse generator 17 to the over-run counter 55.

The control difference counter 31 serves to provide a positive impulse to the valve control 37 when the crosshead 2 is in a position in agreement with the selected forging dimension and will also provide a positive impulse to the valve control 37 when the crosshead 2 is in a position in agreement with the position in agreement with the position selected by means of the decade switch 33.

Furthermore, the control difference counter 31 serves to provide a positive impulse to the valve control 37 when the crosshead 2 is in a position in agreement with the position selected by means of the decade switch 34, and to transmit negative impulses from the impulse generator 17 to the over-run counter 55 as soon as the crosshead 2 over-runs the lower reversing point.

The indicator difference counter 25 receives positive or negative impulses from the oscillator 27 and provides the net result of these impulses to the numerical indicator 26.

The over-run counter 55 receives negative impulses from the control difference counter 31 which are the impulses provided by the impulse generator 17 following movement or over-run of the crosshead 2 below the lower reversing point and the over-run counter 55 is reset to zero by a positive impulse from the control difference counter 31 upon the crosshead 2 reaching the upper reversing point. The result provided by the over-run counter 55 is readable on the indicator 26b of the numerical indicator 26.

Numerical indicator 26 is simply an electrically operated device which serves to provide a visual indication of the output of the indicator difference counter 25 and the output of the over-run counter 55.

Valve control 37 directly controls operation of the press and upon receiving a positive impulse from the selector switch 32 transmits a positive voltage to the return valve 48, and the waste water valve 54 to open the same and cause upward movement of the crosshead 2. When crosshead 2 reaches the upper reversing point the valve control 37 receives a positive impulse from the control difference counter 31 which causes the valve control 37 to transmit a positive voltage to the filling water valve 46 and waste water valve 50 to open the same and to transmit a negative voltage to the return valve 48 and waste water valve 50 to close the same thereby initiating downward movement of the crosshead 2.

Upon the crosshead 2 reaching the point at which flow of filling water is to cease and flow of pressure water being the valve control 37 receives a positive impulse from the control difference counter 31 which causes the valve control 37 to transmit a positive voltage to the pressure water valve 47 to open the same and at the same time to transmit a negative voltage to the filling water valve 46 to close the same.

When the crosshead 2 reaches the lower reversing point the valve control 37 receives a positive impulse from the control difference counter 31 which causes the valve control 37 to transmit a positive voltage to the return valve 48 and waste water valve 54 to open the same and at the same time to transmit a negative voltage to the filling water valve 46, the waste water valve 50 and the pressure water valve 47 to close the same.

The above serves to describe in a manner clear to those skilled in the art the structure and operation of the press control system of this invention.

Whilst an embodiment of the invention has been described so that those skilled in the art will be able to carry the invention into practice, it is to be understood that numerous variations may be made in the specific embodiments described without parting from the spirit or scope of the invention.

I claim:

1. A hydraulic forging press, comprising: an upper die and a lower die between which work-pieces are forged, pistons and cylinders for raising and lowering the upper die, valves controlling the admission of pressure liquid and filling liquid to the said cylinders and the discharge of liquid therefrom, an impulse-generator actuated by the movements of the upper die and adapted to deliver positive and negative impulses according to the magnitude and direction of such movements, an oscillator adapted to furnish positive and negative impulses controllable at will, a control difference counter connected with the impulse-generator and with the oscillator so as to receive impulses from both of them, and, by known digital and switching technique, to deliver switching signals, a valve control actuated by switching signals received from the control difference counter and adapted to open and close the valves of the hydraulic press in accordance with such signals.

2. A hydraulic forging press as claimed in claim 1, further comprising: an indicator-difference counter for counting the impulses furnished by the oscillator, and an indicating device for indicating the number of impulses counted thereby.

3. A hydraulic forging press as claimed in claim 2, further comprising an over-run counter for counting and indicating those impulses that are generated by the impulse-generator between the moment at which the upper die, in descending, reaches the point at which the valve control emits signals for the reversal of the valves and the moment at which the descent of the upper die actually ceases.

4. A hydraulic forging press as claimed in claim 3, further comprising: a decade switch adapted to be set by hand to the desired height of the upper switching point, at which the ascent of the upper die is to be stopped and reversed, above the lower switching point, at which the descent of the upper die is stopped and reversed, a second decade switch adapted to be set by hand to the desired height of the switching point for changing over from the admission of filling liquid to the admission of pressure liquid to the main working cylinder of the press above the said lower switching point, these decade switches being adapted, on reaching the numbers of impulses previously given by the control difference counter to feed impulses from the oscillator to the control difference counter for the correction of the over-run.

References Cited by the Examiner
UNITED STATES PATENTS

| 3,031,903 | 5/62 | Billen | 78—42 |
| 3,057,053 | 10/62 | Schlage | 29—407 |
| 3,118,326 | 1/64 | Wistreich | 78—13 |
| 3,120,053 | 2/64 | Lewis | 29—407 |
| 3,138,976 | 6/64 | Robra | 78—13 |

CHARLES W. LANHAM, *Primary Examiner.*

RICHARD H. EANES, WILLIAM J. STEPHENSON, ROBERT F. WHITE, *Examiners.*